(12) United States Patent
Frederick

(10) Patent No.: US 7,066,530 B2
(45) Date of Patent: Jun. 27, 2006

(54) FILLER PANEL APPARATUS AND METHOD FOR REINFORCING A VEHICLE BODY

(76) Inventor: Jena B. Frederick, P.O. Box 1436, Hamilton, AL (US) 35570

(*) Notice: Subject to any disclaimer, the term of this patent is extended or adjusted under 35 U.S.C. 154(b) by 0 days.

(21) Appl. No.: 11/044,637

(22) Filed: Jan. 27, 2005

(65) Prior Publication Data

US 2006/0033361 A1 Feb. 16, 2006

Related U.S. Application Data

(60) Provisional application No. 60/600,789, filed on Aug. 12, 2004.

(51) Int. Cl.
*B60J 5/04* (2006.01)
*B60J 11/06* (2006.01)

(52) U.S. Cl. .............. 296/187.01; 296/146.5; 296/146.6; 296/191; 296/187.03; 296/187.12

(58) Field of Classification Search ............. 296/146.2, 296/146.5–146.7, 39.1–39.3, 191, 187.02, 296/187.03, 187.01, 187.11, 187.12, 193.05, 296/187.05

See application file for complete search history.

(56) References Cited

U.S. PATENT DOCUMENTS

| | | | | |
|---|---|---|---|---|
| 2,084,014 A | * | 6/1937 | Bronson | 280/169 |
| 3,222,696 A | * | 12/1965 | Grimshaw | 5/402 |
| 3,868,141 A | * | 2/1975 | Johnson | 296/187.12 |
| 3,948,614 A | * | 4/1976 | Michalon | 428/116 |
| 4,217,970 A | * | 8/1980 | Chika | 180/298 |
| 4,221,426 A | * | 9/1980 | Wardill | 296/178 |
| 4,634,167 A | * | 1/1987 | Moriki et al. | 296/76 |
| 4,656,857 A | * | 4/1987 | Tomita | 72/131 |
| 5,076,632 A | * | 12/1991 | Surratt | 296/96.21 |
| 5,089,191 A | * | 2/1992 | Hughes | 264/46.5 |
| 5,458,066 A | * | 10/1995 | Ishida et al. | 105/401 |
| 5,622,402 A | * | 4/1997 | Pritchard et al. | 296/191 |
| 5,811,491 A | * | 9/1998 | Jagawa et al. | 525/71 |
| 6,027,158 A | * | 2/2000 | Yang | 296/146.6 |
| 6,062,624 A | * | 5/2000 | Crabtree et al. | 296/39.3 |
| 6,474,725 B1 | * | 11/2002 | Sotiroff et al. | 296/190.11 |
| 6,543,839 B1 | * | 4/2003 | Gfrerrer et al. | 296/146.6 |
| 6,631,937 B1 | * | 10/2003 | Miyakawa et al. | 296/39.3 |
| 6,890,019 B1 | * | 5/2005 | Leistra et al. | 296/146.6 |

* cited by examiner

*Primary Examiner*—D. Glenn Dayoan
*Assistant Examiner*—Greg Blankenship

(57) ABSTRACT

A filler panel for inserting within a vehicle body section that has a plurality of slats positioned substantially parallel with respect to one another, and each slat has a slat connector mechanism. The apparatus further has a molded encasing exhibiting a shape suitable for insertion into the vehicle body section, and the molded encasing contains each of the plurality of slats secured substantially parallel with respect to one another within the molded encasing such that each connector mechanism associated with each of the plurality of slats protrudes from the encasing such that each connector mechanism is positioned to be affixed to the vehicle body section.

18 Claims, 3 Drawing Sheets

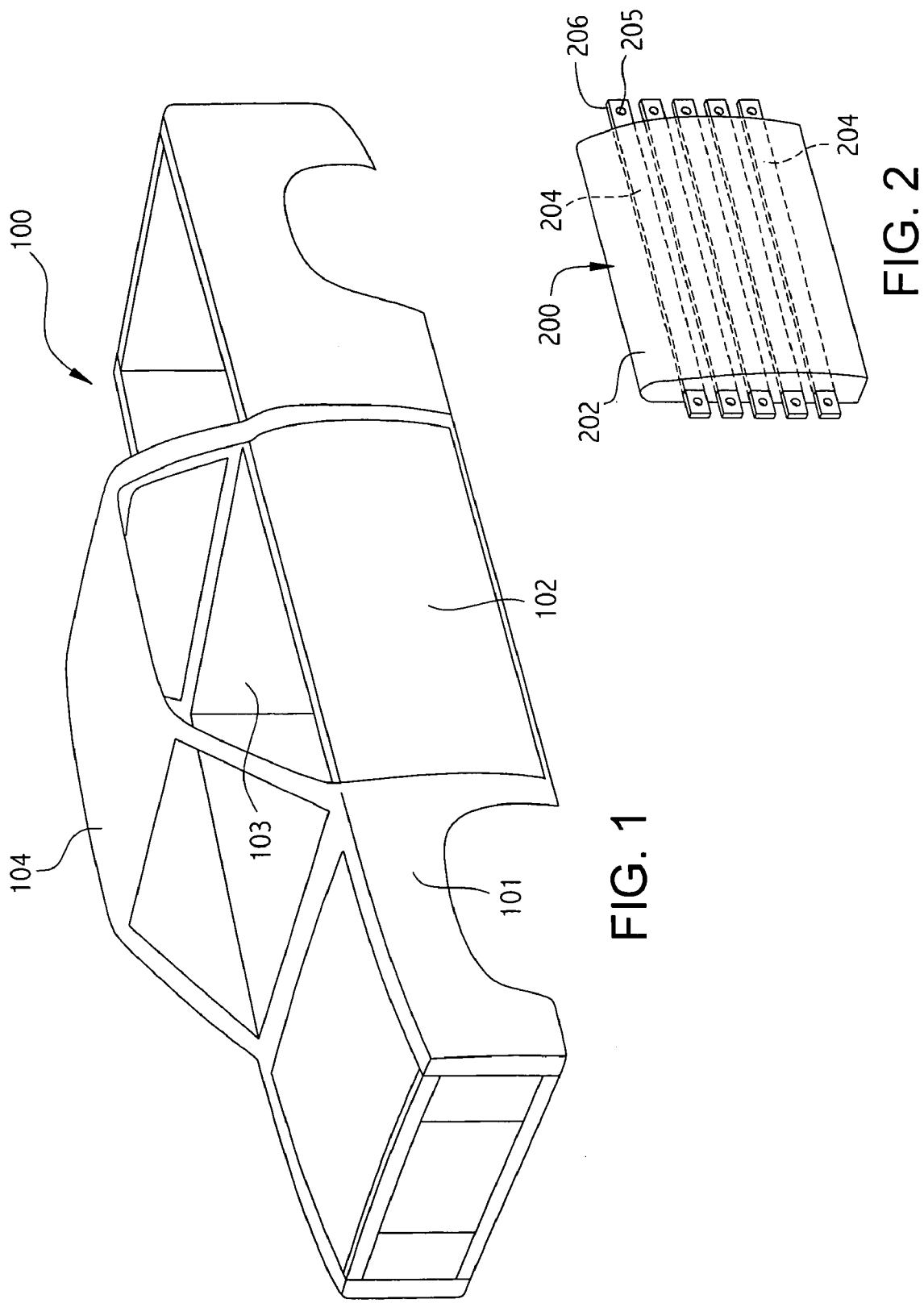

FILLER PANEL APPARATUS AND METHOD FOR REINFORCING A VEHICLE BODY

CROSS REFERENCE TO RELATED APPLICATION

This application claims priority to U.S. Provisional Application No. 60/600,789, entitled "FORTRESS BODY," and filed on Aug. 12, 2004, which is incorporated herein by reference.

RELATED ART

Automobile bodies typically comprise separate and distinct sections that are coupled together to form the entire automobile body structure. For example, a typical automobile body comprises a driver-side door and a passenger-side door, a front left fender and a front right fender, a roof, and a hood. Each of these separate and distinct structural pieces are coupled together, for example with hinges with respect to the doors, or welded together, to form a unitary automobile body.

Typically, these separate and distinct pieces comprise cavities that may contain a skeletal structure, such as, for example, a steel frame. Additionally, however, the cavities may contain hollow areas that are susceptible to collapse upon impact.

SUMMARY OF THE DISCLOSURE

Generally, embodiments of the present invention provide vehicle safety apparatuses and methods.

An apparatus in accordance with one embodiment of the present disclosure is a filler panel for inserting within an vehicle body section comprising a plurality of slats positioned substantially parallel with respect to one another, and each slat has a slat connector mechanism. The apparatus further comprises a molded encasing having a shape suitable for insertion into the vehicle body section, and the molded encasing contains each of the plurality of slats secured substantially parallel with respect to one another within the molded encasing such that each connector mechanism associated with each of the plurality of slats protrudes from the encasing such that each connector mechanism is positioned to be affixed to the vehicle body section.

A method in accordance with another embodiment of the present disclosure comprises the steps of providing a plurality of substantially parallel slats, each of the slats having a slat connector mechanism and enclosing the plurality of parallel slats in a molded encasing. The method further comprises inserting the molded encasing into the vehicle body section, and affixing the molded encasing within the vehicle body section via the slat connector mechanism.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

FIG. 1 depicts an automobile body of the present disclosure.

FIG. 2 depicts a filler section for use in the automobile body of FIG. 1.

DETAILED DESCRIPTION

Figure 3:
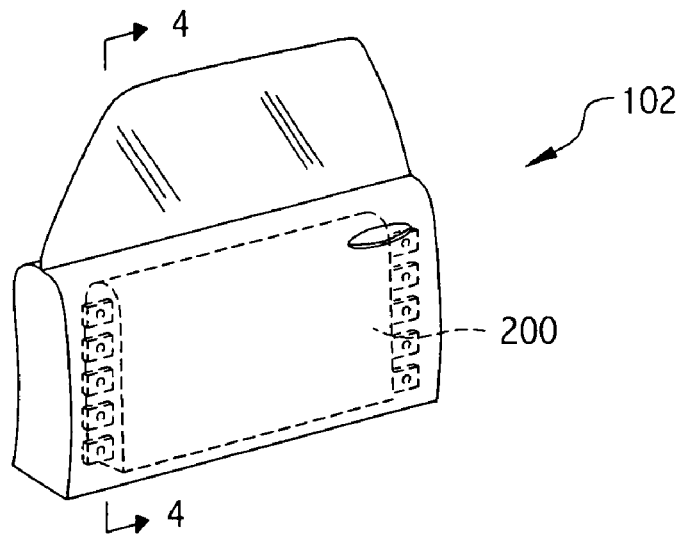
FIG. 3 depicts a perspective view of an automobile door of the automobile body of FIG. 1.

Embodiments of the present disclosure generally pertain to a vehicle safety apparatus that can be installed within automobile frame sections of an automobile body. More specifically, the vehicle safety apparatus comprises an automobile frame section panel that, when installed within a hollow cavity of an automobile section, can reduce and/or eliminate the likelihood that an automobile frame will collapse upon impact if the automobile is involved in a collision.

FIG. 1 illustrates an automobile 100 having a plurality of body sections 101–104. The automobile 100 comprises a front left fender body section 101, a driver-side door body section 102, a rear cab wall body section 103, and a roof body section 104. Each section 101–104 indicated of the automobile body comprises hollow portions that may collapse upon impact if the automobile were involved in a collision.

FIG. 2 depicts a filler panel 200 for inserting into a body section 101–104 of the automobile depicted in FIG. 1. In this regard, the filler panel 200 is preferably unitary and molded specifically for the particular body section 101–104 in which the filler panel 200 is to be inserted.

Specifically, the filler panel 200 is molded for insertion into the driver-side door section 102 of the automobile frame 100 depicted in FIG. 2. The exemplary filler panel 200 comprises a plurality of slats 204 embedded in a unitary molded encasing 202.

Preferably, the encasing 202 is comprised of a material having elastic properties. For example, the encasing 202 may be formed of molded rubber or of an elastic-plastic material.

There are various methods for producing molded rubber, including, but not limited to injection molding, compression molding, thermoforming, casting, and dip molding. The method of producing the encasing 202 is not pivotal to the present disclosure, and any method known or future-developed can be used to create the encasing 202.

The slats 204 are embedded in the unitary molded encasing 202. The slats 204 are preferably comprised of a metal material for providing a skeletal support for the elastic encasing 202. In one embodiment, the slats 204 can be shaped such that the slats 204 run parallel to the body section shape in which the slat 204 is installed. In this regard, for example, the slats 204 may comprise a curvature that parallels the line of the fender 101 (FIG. 1) if the panel 200 is installed in the fender 101 or the curvature of the door 102. Slats 204 that are curved and/or shaped in accordance with the body section 101–104 in which they are installed provide additional support and minimize damage to the body section if the automobile 100 is involved in a collision.

In one embodiment the slats are comprised of steel. During manufacturing, the rubber encasing 202 is formed around the plurality of slats 204. In such an embodiment, the plurality of slats 204 are situated within the plastic encasing 202 parallel with respect to each other. The plastic encasing 202 encases the parallel slats 204.

However, if the panel 200 is to be attached to a body section 101–104, portions 206 of the slats 204 can protrude from the encasing 202. Each of the protrusions 206 of the slats 204 comprise a connector 205, such as, for example, a hole in which a bolt can be inserted and attached to a corresponding connector attached to the body section, as described in more detail with reference to FIG. 4.

Furthermore, the rubber encasing 202 is formed to fit within the body section, e.g., 101–104 (FIG. 1) for which it is being formed. For brevity, an rubber encasing for application in the driver-side door body section 102 of FIG. 1 is described. However, other filler panels may be molded and shaped in order to provide reinforcement for other body section, e.g., body sections 101–104, in other embodiments.

In one embodiment of the filler panel 200 of FIG. 2, each slat 204 is one-sixteenth inch thick steel. Each steel slat 204 is embedded in the molded rubber encasing 202. In this regard, each steel slat 204 is separated by three inches of molded rubber of the encasing 202. Furthermore, each slat 204 is surrounded in the front and the back by five-eighths inch of rubber that is shaped to fit the body section in which it is to be inserted.

Note that more than one panel filler 202 could be connected together via the protrusions 206 and the bolt-receiving openings 205 to form a longer panel filler 202. Further note that for additional attachment, portions of the rubber adjacent the slats 204 could be cut away to expose the slat 204. Thus, other attachment mechanisms could be affixed to the slats at other points along each slat 204 prior to the filler panel 200 being inserted into a body section.

Figure 4:
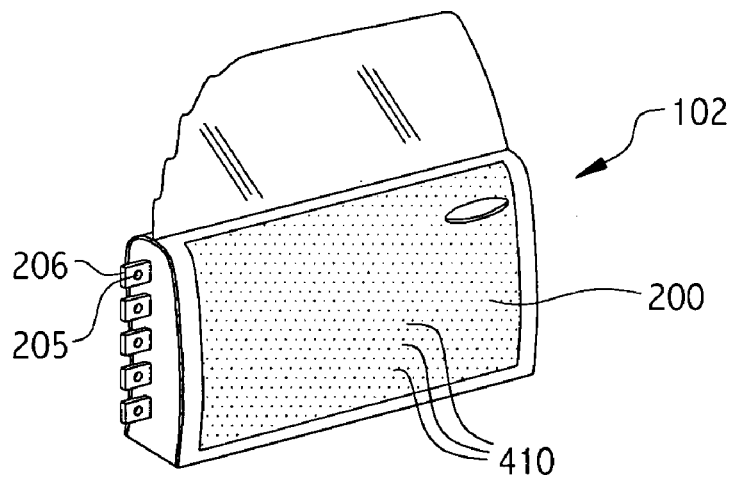
FIG. 4 is a perspective view of the automobile door of FIG. 3 cut away to illustrate the connector s of the filler section of FIG. 2.

FIG. 3 depicts the driver-side door body section 102 of the automobile 100 of FIG. 1. Installed within the driver-side door body section 102 in FIG. 3 is the panel 200 depicted in FIG. 2. Notably, the filler panel 200 is positioned within the body section 102 in order to provide FIG. 4 is a perspective cut-away view of the driver-side door body section 102 of FIG. 3. FIG. 4 illustrates that the portions 206 of the slats 204 (FIG. 2) protrude from the filler panel 200. In protruding from the filler panel 200, the protrusions 206 expose a bolt-receiving opening 205 which is used to attach the filler panel 200 to the driver-side door body section 102. Attachment of the filler panel 200 within the body section 102 is described in more detail with reference to FIG. 5.

In one embodiment, the panel 200 comprises a portion of small glass particles 410 embedded within the molded rubber or the elastic-plastic material. Such embedded glass particles 410 may give the panel 200 a reflective top surface.

In yet another embodiment, the glass particles 410 may exhibit a particular color, i.e., red, green, blue, etc. In this regard, the embedded colored glass particles 410 provide the panel 200 a colored appearance, corresponding to the particular color of the glass particles, and such appearance may be used for aesthetic purposes.

Although as described herein the panel 200 is internal to the body section 101–104, the panel 200 may further be installed such that a substantial portion or the entire panel 200 is exposed to the interior of the automobile 100 or to the exterior of the automobile 100. An embodiment of external exposure of the panel 200 is illustrated in FIG. 4. In this regard, a portion of the panel 200 is externally exposed and is visible by onlookers (not shown) viewing the automobile 100.

Therefore, if the panel 200 comprises embedded colored glass particles that reflect a particular color, then light reflected from the colored glass particles 410 provide an aesthetically pleasing characteristic to the automobile. Additionally, the reflective characteristic of the glass particles 410 embedded in a exteriorly exposed panel 200 provides the automobile 100 with a reflective characteristic thereby making the automobile 100 more visible during adverse driving conditions, e.g., at dark, when fog is present, during a rainstorm or a snowstorm. Furthermore, the glass particles 410 embedded in the panel 200 that is exposed to weather elements would further protect the panel 200 from deterioration.

In yet another embodiment, the entire automobile door 102 exterior is comprised of the panel 200. Such automobile door 102 being entirely comprised of the rubber material would thereby provide a more substantial softening effect in collisions.

Figure 5:
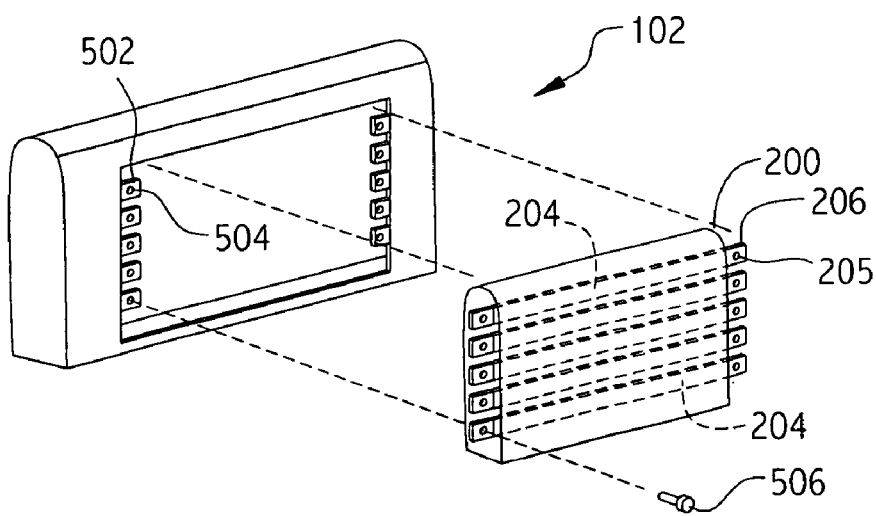
FIG. 5 is an exploded view of the molded encasing of FIG. 2 attached to the driver-side door body section of FIG. 3.

FIG. 5 depicts an exploded cut away view of the driver-side body section 102 of FIG. 3 of an exemplary embodiment of the present disclosure. FIG. 5 depicts the driver-side body section 102 having a plurality of connector mechanisms 502 attached to the body section 102. The plurality of connector mechanisms are positioned for receiving corresponding slat connector mechanisms on the filler panel 200, which is described in more detail hereafter.

In one embodiment, each connector mechanism 502 comprises a bolt-receiving opening 504. The bolt-receiving opening 504 can be configured in numerous ways known in the art. For example, the opening 504 can be a threaded opening for receive a threaded bolt. Further, the opening 504 may be configured for receiving a bolt and the bolt may be attached to the connector mechanism with a nut (not shown).

As described herein, an exemplary embodiment of the filler panel 200 is comprised of a molded rubber encasing 202. The molded rubber encasing encases a plurality of slats 204. Each of the slats 204 preferably comprise a protruding portion 206 having a connector mechanism 205.

Note that the molded rubber encasing 202 is preferably shaped to fit within the body section in which it is being inserted. Although the present disclosure depicts and describes a filler panel 200 configured for a driver-side door body section 102, in other embodiments, the filler panel 200 can be configured to fit within other body section, such as, for example, the fender 101 (FIG. 1), the rear cab wall 103 (FIG. 1), or the cab roof 104 (FIG. 1).

During assembly, the filler panel 200 is placed within the body section 102. In placing the filler panel 200 within the body section 102, the body section connector holes 504 are aligned with the slat connector holes 205. A bolt 506 can then be placed within the opening 504 and the opening 506 in order to attach the filler panel 200 within the body section 102.

Note that the filler panel 200 may be completely enclosed within the body section 102. Additionally, however, the filler panel 200 may be exposed to the external environment.

Figure 6:
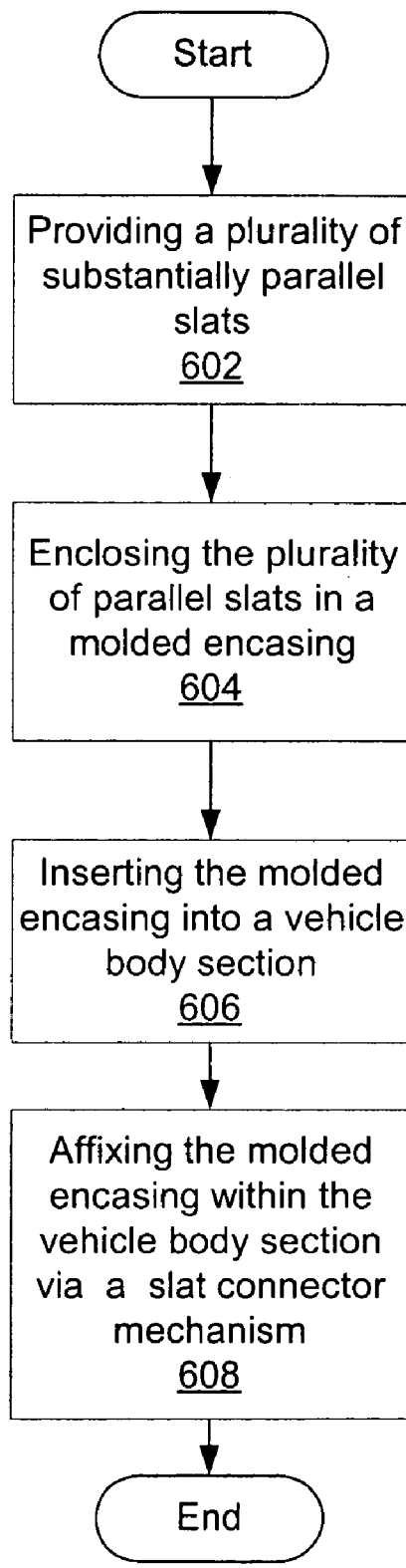
FIG. 6 is flowchart illustrating an exemplary vehicle body section reinforcement method.

FIG. 6 is a flowchart illustrating an exemplary method of reinforcing vehicle body sections of the present disclosure. The first step is providing a plurality of substantially parallel slats, as indicated in step 602. As described hereinabove, each slat 204 preferably has a slat connector mechanism 205 that allows the panel filler 200 to be attached to the body section 102. In one embodiment, the connector mechanism 205 is a bolt-receiving opening.

The next step is enclosing the plurality of parallel slats 204 in a molded encasing 202, as indicated in step 604. As described hereinabove, the molded encasing 202 can be of an elastic material, e.g., rubber. Furthermore, the molded encasing 202 can be molded into different shapes depending upon the body section 101–104, for example, in which the filler panel is to be inserted.

The next step is inserting the molded encasing 202 into the vehicle body section 102, as indicated in step 606. The final step is affixing the filler panel 200 within the vehicle body section 102 via the slat connector mechanism 504.

The invention claimed is:

1. A filler panel for inserting with a vehicle body section, comprising:
    a plurality of slats positioned substantially parallel with respect to one another, each slat having a slat connector mechanism; and
    a molded encasing having a shape suitable for insertion into the vehicle body section, the vehicle body section having an interior panel and an exterior panel that form a hollow cavity, the molded encasing containing each of the plurality of slats and securing each of the plurality of slats parallel with respect to one another with the molded encasing such that each connector mechanism associated with each of the plurality of slats protrudes from the encasing and each connector mechanism is positioned to be affixed to the vehicle body section, the molded encasing positioned within the hollow cavity.

2. The filler panel of claim 1, wherein each of the slat connector mechanisms is affixed to a corresponding body section connector mechanism.

3. The filler panel of claim 2, wherein the slat connector mechanism comprises a portion of the slat having a bolt-receiving hole and wherein the body section connector mechanism has a bolt-receiving hole.

4. The filler panel of claim 3, wherein the filler panel is affixed to the body section via a bolt through the slat connector mechanism and the body section connector mechanism.

5. The filler panel of claim 1, wherein the slats are comprised of steel.

6. The filler panel of claim 1, wherein the molded encasing is comprised of an elastic material.

7. The filler panel of claim 6, wherein the elastic material is rubber.

8. The filler panel of claim 1, where the vehicle body section is a door.

9. A filler panel comprising a plurality of slate positioned substantially parallel with respect to one another, each slat having a slat connector mechanism and a molded encasing having a shape and/or curvature suitable for installing into the vehicle body section, wherein the molded encasing containing each of the plurality of slats is positioned such that each connector mechanism associated with each of the plurality of slats protrudes from the molded encasing; and each connector mechanism is positioned to be affixed to the vehicle body section, for securing said filler panel to the exterior of the vehicle section via slat connector mechanisms, in conjunction with an interior body panel, but not encompassed by an exterior metal body panel, leaving said molded encasing exposed to exterior and positioned such that it becomes a replacement for the exterior metal body panel.

10. The filler panel of claim 9, wherein the surface of the elastic material comprises a plurality of small colored glass particles for an aesthetic effect.

11. The filler panel of claim 9, wherein the slats are comprised of steel.

12. The filler panel of claim 9, wherein the molded encasing is comprised of an elastic material.

13. The filler panel of claim 12, wherein the elastic material is rubber, and comprises a plurality of small colored glass particles molded into the surface for aesthetic effect.

14. A method for reinforcing a vehicle body section, the method comprising the steps of: providing a plurality of substantially parallel slats enclosed within a molded encasing, each of the slats having a protruding connector mechanism for installing the filler panel into the vehicle body section in conjunction with an interior body panel, but not encompassed by a metal exterior panel.

15. The method of claim 14, further comprising the step of affixing each of the slat connector mechanisms to a corresponding body section connector mechanism.

16. The method of claim 15, wherein the step of affixing each slat connector mechanism comprises the steps of: inserting a bolt into a hole in the slat connector mechanism; and inserting the bolt into a bolt receiving hole in the body section connector mechanism.

17. The method of claim 16, further comprising the step of affixing the molded encasing to the body section via the bolt through the slat connector mechanism and the body via section connector mechanism.

18. The filler panel of claim 14, wherein the filler panel forms an exterior part of the vehicle body section.

* * * * *